INVENTOR.
Nathaniel B. Kell
BY
W. E. Finch
His Attorney

Oct. 1, 1963   N. B. KELL   3,105,558
VARIABLE PITCH PROPELLER
Filed June 22, 1961   2 Sheets-Sheet 2

INVENTOR.
Nathaniel B. Kell
BY
*W. E. Finken*
His Attorney

United States Patent Office 3,105,558
Patented Oct. 1, 1963

3,105,558
VARIABLE PITCH PROPELLER
Nathaniel B. Kell, Indianapolis, Ind., assignor to General Motors Corporation, Detroit, Mich., a corporation of Delaware
Filed June 22, 1961, Ser. No. 118,842
7 Claims. (Cl. 170—160.51)

This invention pertains to aircraft propellers, and particularly to a torque responsive, automatically variable pitch propeller.

Single engine aircraft do not require the complex variable pitch propellers which are used on multi-engine aircraft. However, in order to obtain optimum aircraft performance it is necessary to adjust the pitch of the propeller blades, and the present invention is directed to automatic, torque responsive pitch adjusting means which are contained within the propeller hub and operate to decrease the pitch position of the propeller blades in proportion to the torque input. Accordingly, among my objects are the provision of a variable pitch propeller embodying torque responsive pitch adjusting mechanism; the further provision of a variable pitch propeller including prestressed, deformable, elastic reaction means for controlling the pitch position of the propeller blades; and the still further provision of a propeller of the aforesaid type including mechanical stops for determining the range of pitch adjustment.

The aforementioned and other objects are accomplished in the present invention by utilizing the prestressed elastic reaction means to normally bias the blades to their maximum pitch positions such that when the propeller is driven the input torque tends to rotate the propeller blade about their longitudinally axes toward their minimum pitch stop positions thereby deforming the elastic means. The propeller assembly comprises a hub which is connected to a drive shaft. A housing is bearing supported on the hub and has a pair of diametrically opposed propeller blades journalled therein for rotation about their longitudinal axes. Each blade is attached to a control sleeve having a crank rockably mounted in the hub and connected by linkage means with the elastic reaction means. Thus, the propeller blades, control sleeves and the housing are rotated with the hub through the cranks. The arrangement of the parts is such that the pitch position of the propeller blades will be automaticially decreased when the input torque is sufficient to overcome the prestressed reaction means, while the propeller blades will otherwise be maintained at their maximum pitch positions by the prestressed reaction means.

Further objects and advantages of the present invention will be apparent from the following description, reference being had to the accompanying drawings, wherein a preferred embodiment of the present invention is clearly shown, and wherein similar numerals depict similar parts throughout the several views.

Figure 1:
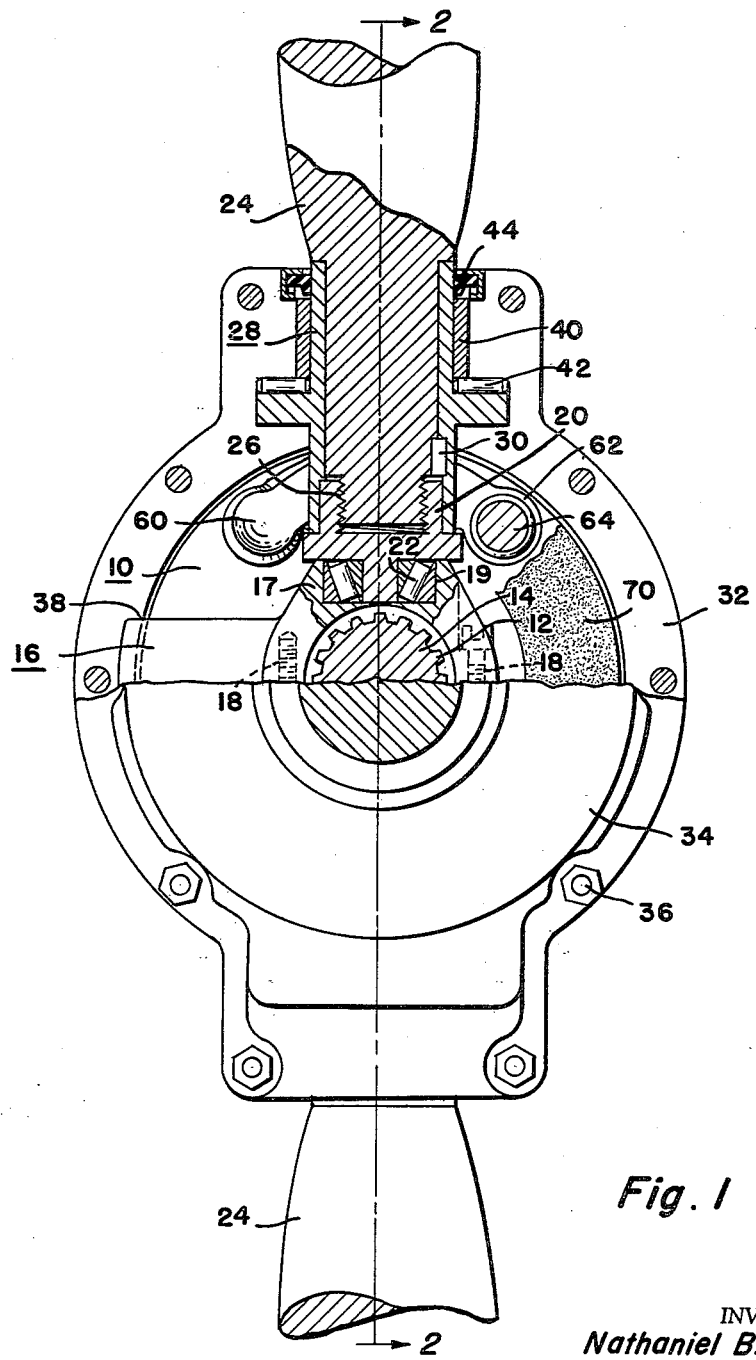
FIGURE 1 is a fragmentary rear view, partly in section and partly in elevation, of a propeller constructed according to the present invention.
Figure 2:
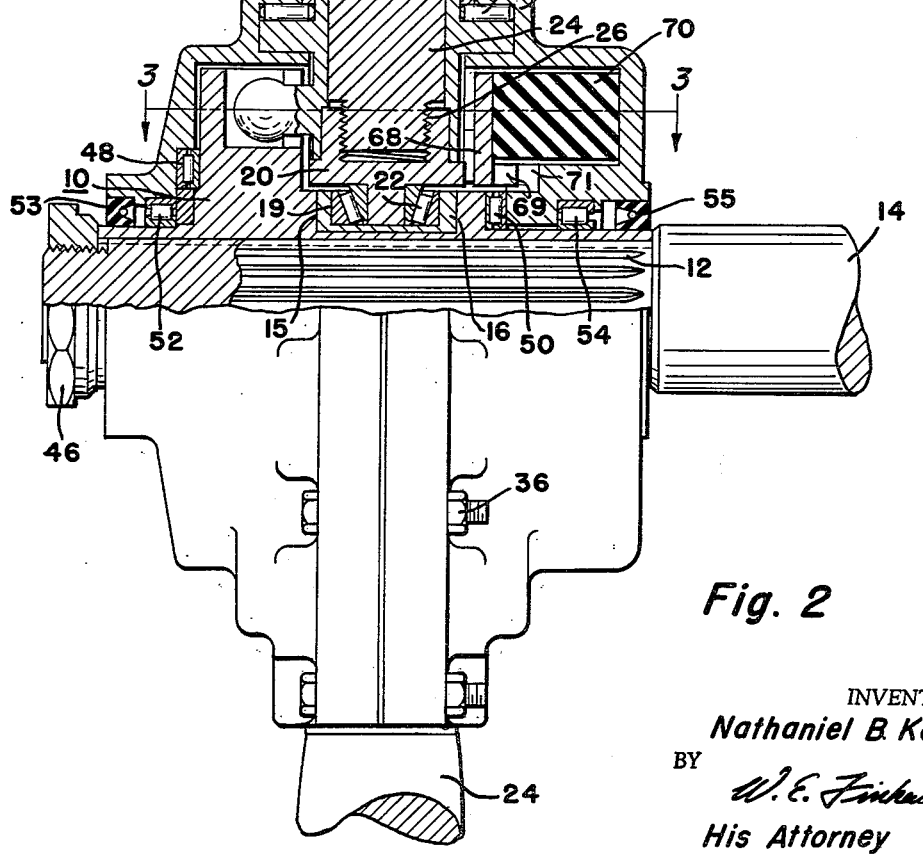
FIGURE 2 is a view, partly in section and partly in elevation, taken along lines 2—2 of FIGURE 1.

With reference to FIGURES 1 and 2, the propeller includes a hub 10 having a straight spline connection at 12 with a centrally arranged drive shaft 14. The hub 10 has an intermediate annular groove 15 within which a pair of radially extending bearing struts 16, only one being shown in FIGURE 1, are disposed. The bearing struts have mating semi-circular portions 17 which encompass the hub and are secured together by bolts 18. A blade support 20, one being shown in FIGURES 1 and 2, is journalled in a cup-shaped recesss 19 of each bearing strut 16 by a roller bearing assembly 22. The root ends of the propeller blades 24 are threadedly connected at 26 with the blade supports 20. The shank portion of each propeller blade 24 is mounted within a control sleeve 28 and keyed thereto at 30. Each control sleeve 28 is thus connected to rotate with its respective propeller blade about the longitudinal axis thereof. The propeller blades 24 have equal areas on both sides of their longitudinal axes and thus may be termed balanced propeller blades.

The hub 10 is enclosed by a two-part housing including a front section 32 and a rear section 34, the sections being connected together by bolts 36. The parting line between the sections 32 and 34 is coincident with the longitudinal axes of the propeller blades 24 and, as seen in FIGURE 1, the outer end of each bearing strut 16 is received in a slot 38 formed in the front and rear sections 32 and 34 at the parting line therebetween. The two-part housing forms a pair of sockets within which the control sleeves 28 are rotatably journalled by plain bearings 40, outward radial movement of the blades 24 and the control sleeves 28 being precluded by a roller bearing assembly 42. A suitable seal 44 surrounds each control sleeve 28 and prevents the escape of lubricant from the bearing assemblies.

The hub 10 is restrained against axial movement relative to the drive shaft 14 by a nut 46 which threadedly engages the shaft and abuts the front end of the hub. The housing is bearing supported on the hub 10 by front and rear needle thrust bearings 48 and 50 and front and rear radial bearings 52 and 54. Loss of lubricant from the several housing bearings is prevented by front and rear seals 53 and 55.

Figure 3:
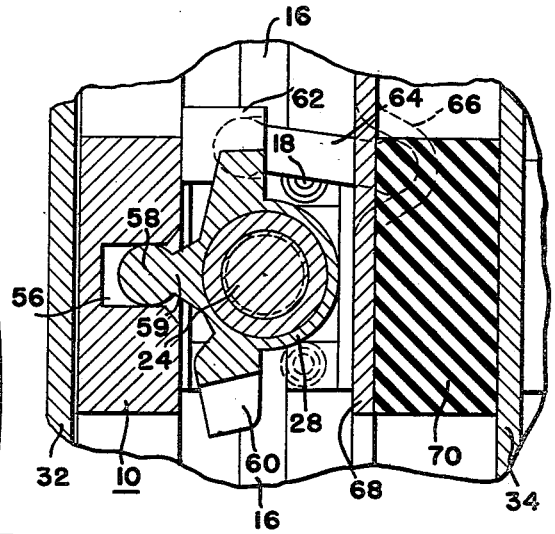
FIGURE 3 is a fragmentary sectional view taken along line 3—3 of FIGURE 2.

As seen particularly in FIGURE 3, the hub 10 has a pair of bearing recesses 56, each of which receives a ball-like formation 58 of a crank arm 59 integral with each control sleeve 28. Each control sleeve 28 is formed with a pair of substantially radial extensions, or abutments, 60 and 62, the extensions 60 being engageable with the hub 10 for determining the minimum pitch position of the propeller blades, while the extensions 62 are engageable with the hub 10 at the maximum pitch position. Each extension 62 is formed with a ball socket for receiving a ball-like formation on the end of a link 64. The other end of the link 64 has a ball-like formation which is disposed within a socket 66 in a thrust ring 68. The thust ring 68 is supported for axial movement within the rear section 34 of the propeller housing which contains a prestressed elastomeric ring 70. The thrust ring 68 has a tang 69 disposed in an axial slot 71 in the housing section 34 and thus is slidable axially relative thereto. The ring 70 may be composed of rubber or any other suitable plastic having a controlled density whereby its elastic and deformation characteristics are such as to match the torque characteristics of the propeller. As shown in FIGURE 2, sufficient clearance is provided within the housing section 34 to accommodate deformation of the elastic ring 70.

The propeller blades are shown in their maximum pitch positions in FIGURES 1, 2 and 3 whereat the abutment 62 of each control sleeve 28 engages the hub 10. The propeller blades are normally maintained in this position by the prestressed elastic reaction member 70. When the drive shaft 14 is rotated in the clockwise direction as seen in FIGURE 1, rotation about the horizontal propeller axes is imparted to the blades 24 and hence the propeller housing through the cranks 59 on the control sleeves. The initial prestressing of the elastic ring 70 acts in opposition to the torque input during normal operation. However, when the engine is accelerated such as during takeoff, or climbing, the increased input torque to which the blades are subjected rotates the blades about their longitudinal axes towards their minimum pitch positions whereat the abutments 60 engage the hub 10. During rotation of the propeller blades 24 about their axes in the clockwise direction as viewed in FIGURE 3, the elastic ring 70 is deformed due to movement of the thrust ring 68 to the right. The thrust ring 68 also functions to coordinate the pitch adjusting movement of the two propeller blades. The variation in the pitch position of the propeller blades is responsive solely to the input torque of the drive shaft 14. Thus, when the input torque is reduced to the normal operating range, the elastic ring 70 will reposition the blades at their maximum pitch position where the abutments 62 engage the hub 10 as shown in FIGURE 3.

While the embodiment of the invention as herein-disclosed constitutes a preferred form, it is to be understood that other forms might be adopted.

What is claimed is as follows:

1. A variable pitch propeller including in combination, a hub, a housing journalled on said hub, a plurality of blades journalled in said housing for rotation about their longitudinal axes to different pitch positions, a control sleeve attached to each propeller blade having abutment means engageable with said hub to determine the minimum and maximum pitch positions of each blade, prestressed elastic means disposed within said housing and operatively connected with the control sleeve of each blade for normally maintaining said blades at their maximum pitch positions, and means drivingly interconnecting said hub and said blades through said control sleeves and said elastic means such that pitch adjusting movement of said blades is responsive to input torque.

2. A variable pitch propeller including in combination, a hub, a housing journalled on said hub, a bearing strut assembly encircling a portion of said hub extending transversely thereof and interconnected with said housing, a plurality of radially arranged blade support members journalled in said bearing strut assembly, a plurality of propeller blades attached to said blade support members and journalled in said housing for rotation about their longitudinal axes to different pitch positions, prestressed elastic means disposed within said housing and operatively connected with said blades for normally maintaining said blades at a predetermined pitch position, and means drivingly interconnecting said blades and said hub through said elastic means whereby the pitch adjusting movement of said blades is responsive to input torque.

3. A variable pitch propeller including in combination, a hub, a housing journalled on said hub, a bearing strut assembly encircling a portion of said hub extending transversely thereof and interconnected with said housing, a plurality of radially arranged blade support members journalled in said bearing strut assembly, a plurality of propeller blades attached to said blade support members and journalled in said housing for rotation about their longitudinal axes to different pitch positions, a control sleeve attached to each blade having abutment means engageable with said hub to determine the minimum and maximum pitch positions of said blades, prestressed elastic means disposed within said hub, linkage means interconnecting said elastic means and said control sleeves for normally maintaining said blades at their maximum pitch positions, and means drivingly interconnecting said blades through said control sleeves and said elastic means whereby pitch adjusting movement of said blades is responsive to input torque.

4. A variable pitch propeller including in combination, a hub, a housing journalled on said hub, a bearing strut assembly encircling a portion of said hub extending transversely thereof and interconnected with said housing, a plurality of radially arranged blade support members journalled in said bearing strut assembly, a plurality of propeller blades attached to said blade support members and journalled in said housing for rotation about their longitudinal axes to different pitch positions, a control sleeve attached to each blade including a crank arm pivotally supported in said hub and constituting a driving connection between said hub and said blade, prestressed elastic means disposed within said housing, and linkage means interconnecting each control sleeve and said elastic means whereby pitch adjusting movement of said blades is responsive to input torque.

5. The variable pitch propeller set forth in claim 4 wherein the pivotal connection between each crank arm and said hub comprises a ball stud on the end of each crank arm, and a plurality of sockets in said hub for receiving said ball studs.

6. The variable pitch propeller set forth in claim 4 wherein said prestressed elastic means comprises a deformable annnulus of elastomeric material.

7. The variable pitch propeller set forth in claim 6 including an axially movable thrust ring engageable with said annulus of elastomeric material having sockets therein, and wherein said linkage means interconnecting each control sleeve and said elastic means comprises a link having ball studs at each end disposed respectively within a socket in said control sleeve and one of said sockets in said thrust ring.

References Cited in the file of this patent

UNITED STATES PATENTS

| | | |
|---|---|---|
| 1,765,091 | Morris | June 17, 1930 |
| 1,875,998 | Everts | Sept. 6, 1932 |
| 1,970,114 | Wiegand | Aug. 14, 1934 |
| 2,097,643 | Raggio | Nov. 2, 1937 |
| 2,998,080 | Moore | Aug. 29, 1961 |

FOREIGN PATENTS

| | | |
|---|---|---|
| 433,036 | Great Britain | Aug. 2, 1935 |